United States Patent [19]
Green

[11] 3,724,595
[45] Apr. 3, 1973

[54] TUNA TOWER

[76] Inventor: Jeffrey S. Green, 16810 N.E. 4th Court, North Miami Beach, Fla. 33162

[22] Filed: Apr. 14, 1972

[21] Appl. No.: 244,111

[52] U.S. Cl. ................. 182/118, 182/113, 182/172, 182/178
[51] Int. Cl. ........................... E06c 5/02, E06c 7/18
[58] Field of Search...... 182/118, 119, 178, 113, 108, 182/107, 179, 129, 83, 172

[56] References Cited

UNITED STATES PATENTS

| | | |
|---|---|---|
| 478,841 | 7/1892 | Bodette .......................... 182/118 |
| 2,335,046 | 11/1943 | Droeger ........................ 182/119 |
| 3,009,534 | 11/1961 | Folley .......................... 182/119 |
| 3,463,265 | 8/1969 | Clover .......................... 182/119 |

*Primary Examiner*—Reinaldo P. Machado
*Attorney*—John Cyril Malloy

[57] ABSTRACT

An adjustable, prefabricated tuna tower for installation on boats used for sport fishing. The tuna tower of the present invention is provided in the form of a plurality of sub-assemblies, braces and struts which are sold in a carton package and which may be assembled and installed on any one of a plurality of types of boats having variable beam measurements.

10 Claims, 4 Drawing Figures

PATENTED APR 3 1973 3,724,595

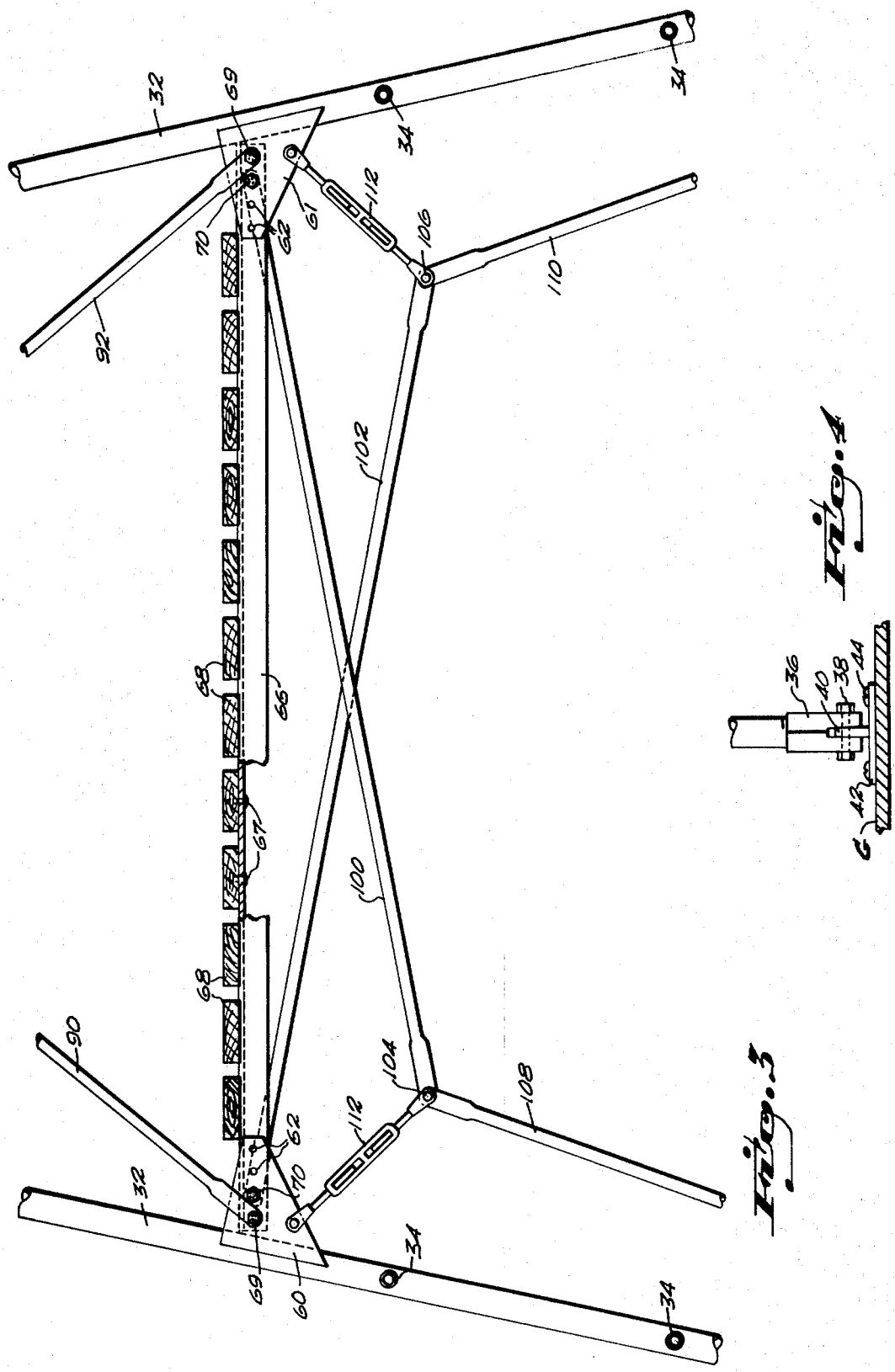

TUNA TOWER

STATE OF THE PRIOR ART

Tuna towers are structures, usually made from aluminum tubing or pipe, which provide a platform, substantially elevated above the basic structure of fishing boats, to give sport fishermen the advantage of a high viewing position to enable them to see and identify fish under the surface of the water.

As the name "Tuna Tower" implies, this type of elevated structure, on a fishing boat, is widely used for spotting tuna fish, however, they are equally widely used to spot many other species of salt water fish such as sailfish, marlin, dolphin fish, etc.

Heretofore, most sport fishermen, desirous of providing their boats with tuna towers, had to resort to the relatively expensive method of having the towers custom built to their boats. The cost factor is therefore a great deterent to the average fisherman who owns a relatively small, inexpensive boat.

BACKGROUND OF THE PRESENT INVENTION

In recent years, boating and sport fishing in salt water have grown immensely and are no longer sports reserved for the very wealthy. While the tuna tower of the present invention is not limited for use on small boats, it is particularly adaptable to installation on boats ranging in size from approximately 17 feet up to approximately 25 feet, for instance, because one size of tuna tower, in accordance with the present invention, is adjustable to the beam measurements of most boats within that size range.

It is therefore a principal object of the present invention to provide a tuna tower which may be prefabricated in quantity and packaged in cartons as a plurality of sub-assemblies, spars and braces and which may be easily assembled and mounted on any of a plurality of boats having different beam measurements.

It is a further object of this invention to provide a tuna tower which provides a substantial savings in money over a comparable tuna tower, custom fitted to a particular size boat.

Yet another object of the instant invention is to provide a tuna tower comprised of a pair of ladder portions, extending up to an elevated platform from opposed sides of the boat; a top portion, connecting between said ladder portions and forming protective rails about said platform and a plurality of struts and braces mounted to prevent transverse and longitudinal flexing of the tower.

A still further object of this invention is to provide a control panel on the forward portion of said protective rails, on which a second complete set of controls can be mounted for operation of the boat by a person on the tuna tower platform.

Another object of the present invention is to provide adjustable connection means, between the platform and the opposed ladder portions, which varies the transverse measurement between the foot portions of the ladders to adapt the tuna tower to a variety of boats having different beam measurements.

A further object of the instant invention is to fabricate the ladder portions of a material such as aluminum tubing which has a degree of inherent flexibility to cooperate with said adjustable connection means to provide the maximum degree of adjustability of the tuna tower relative to the variable beam measurements of the boats to which it is to be fitted.

BRIEF DESCRIPTION OF THE DRAWINGS

FIG. 3 is a cross sectional view taken through the platform portion of the tuna tower, illustrating the adjustable connection thereof to the opposed ladder portions; and FIG. 4 is a detailed view, typical of the connection to the boat, of the foot portions of the ladders and struts.

DETAILED DESCRIPTION OF THE DRAWINGS

Figure 1:
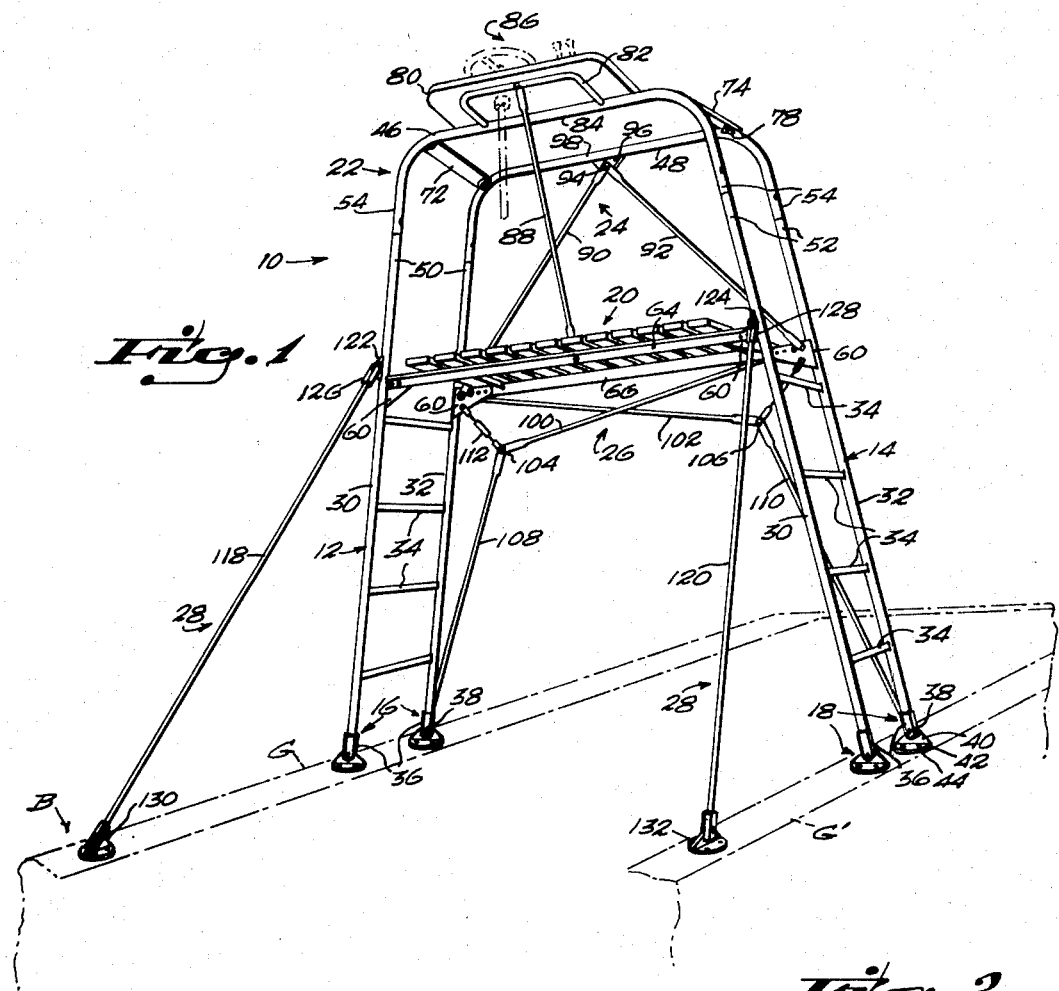
FIG. 1 is a perspective view of the tuna tower of the present invention mounted in spanning relation to the cockpit of a boat.

With reference to the drawings, in which like reference numerals designate like or similar parts throughout the various views, and with particular reference to FIG. 1, the numeral 10 indicates the tuna tower of the present invention, generally comprised of a pair of opposed ladder sub-assemblies 12 and 14, each having a pair of foot portions 16 and 18 fixed to the opposed gunwalls G and G' of a boat B, a platform sub-assembly 20, adjustably fixed between the ladders 12 and 14, downwardly of the upper ends thereof, an upper rail sub-assembly 22, fixed to and bridging the upper ends of the ladders 12 and 14, upper and lower transverse bracing means 24 and 26 and longitudinal strut means 28.

Each ladder sub-assembly 12 and 14 is comprised of a pair of spaced apart, parallel side rails 30 and 32, connected as by welding to a plurality of parallel rungs 34. Each of the pairs of foot portions 16 and 18 is screw threadly engaged by a yoke fitting 36, FIG. 4, which is privotally connected at 38 to an upstanding lug 40 of a base plate 42, fixed by appropriate attachment means 44 to the gunwalls G and G'.

Figure 2:
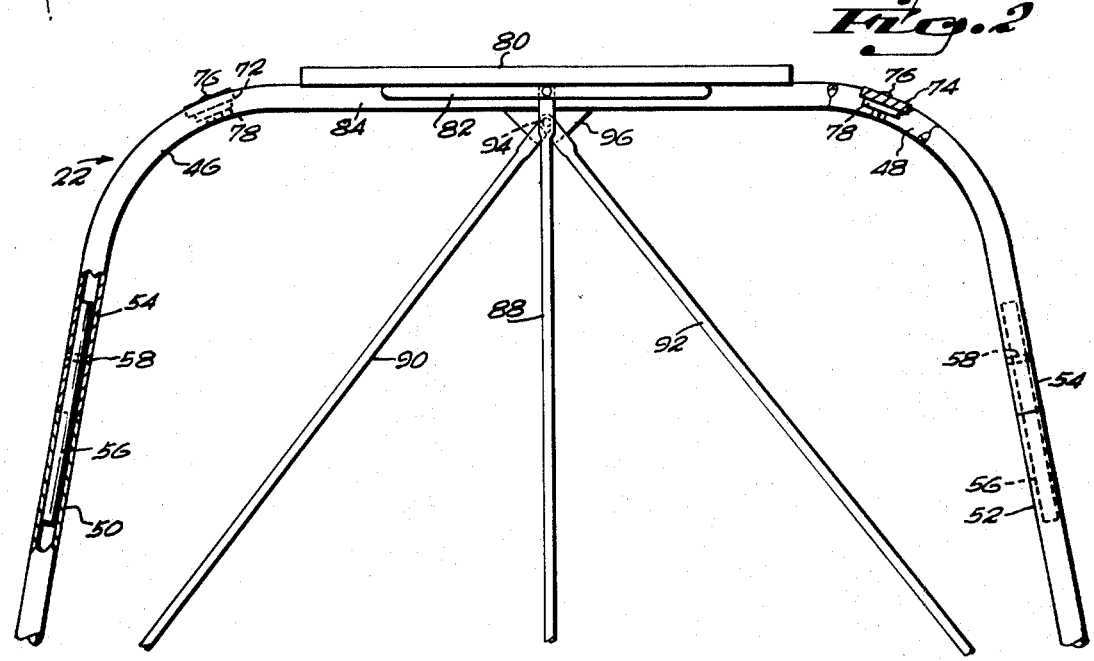
FIG. 2 is an enlarged, detailed, front elevational view of the top portion of the tuna tower, parts being broken away to better illustrate some details of the invention.

The upper rail sub-assembly 22 is comprised of front and back tubular rail members, 46 and 48 which are of generally inverted U-shaped configurations, forming a bridge between the upper ends 50 and 52 of the respective pairs of spaced apart ladder rails 30 and 32. As illustrated in FIG. 2 each downwardly turned end portion 54 of both inverted U-shaped rail members 46 and 48 is provided with an outwardly and downwardly extending stud 56 pinned as at 58 within each respective end 54. Each stud 56 is adapted to be slidably engaged within an upper end 50 and 52 of the respective pairs of ladder rails 30 and 32 to form a bridge between the ladders 12 and 14.

The platform sub-assembly 20 is adjustably fixed in spanning relation between the respective pairs of ladder rails 30 and 32 just upwardly of the top rungs 34 of said ladders and downwardly of the upper rail ends 50 and 52. The ladders 12 and 14 are provided with front and back pairs of aligned inwardly projecting gussets 60 and 61 welded to both pairs of ladder rails 30 and 32 and each gusset 60 and 61 includes a plurality of horizontally aligned through holes 62, four as illustrated in FIG. 3.

As illustrated in FIGS. 1 and 3, the platform 20 is comprised of front and back transverse rails 64 and 66 interconnected, substantially across their widths, by a plurality of parallel slats 68, fixed to the rails 64 and 66 as by screws 67. As best illustrated in FIG. 3, the opposed ends of each transverse rail 64 and 66 are provided with appropriate through holes for selective bolted engagement 69 and 70 with any two of the respective gusset holes 62. Therefore, the span, between the ladder foot portions 16 and 18, is adjustable, as determined by the selective bolted connections 69 and 70 with the pluralities of gusset holes 62 and the inherent flexibility of the tubular ladder rails 30 and 32. For example, the span between the foot portions 16 and 18 of the ladders 12 and 14 is variable to a degree which permits installation of a tuna tower of the present invention on boats having beam variations upwardly of two feet. This degree of adjustability permits one basic tuna tower to be installed, for example, on most open type fishing boats up to 23 to 25 feet in length.

Referring to FIGS. 1 and 2, the opposed sides of the upper rail sub-assembly 22 comprised of the rails 46 and 48 are interconnected by parallel side rails 72 and 74 which are bolted as at 76 between respective pairs of ears 78 fixed to and extending inwardly in opposed relation, from the rails 46 and 48.

A horizontal, forwardly extending control panel 80 may be fixed by fastening means such as screws (not shown) to a forwardly extending U-shaped rail 82, fixed as by welding to the transverse span 84 of the front rail 46, FIGS. 1 and 2. As indicated generally at 86, in broken lines in FIG. 1, a set of controls may be mounted on the panel 80 to permit the lookout on the platform to control the boat. A brace member 88 is connected between the U-shaped rail 82 and the transverse front rail 64 and a pair of brace members 90 and 92 are bolted at 94 to a lug 96, centrally fixed to the transverse portion 98 of the back rail 48, and diverge downwardly to points of attachment by the bolts 69 to the rear gussets 60 and 61.

The lower brace means 26 is comprised of a pair of cross braces 100 and 102, fixed at their respective outer ends to the rear gussets 60 and 61 by the bolts 70. Each cross brace 100 and 102 extends diagonally across the tuna tower to points of pivotal attachment 104 and 106 to respective outwardly and downwardly extending brace members 108 and 110 which are anchored at their lower ends to the respective pivot connections 38 at the foot of the ladder rails 32. A turnbuckle 112 is interconnected between each point of attachment 104 and 106 and the respective adjacent gussets 60 and 61 to tension each pair of compound braces 100, 108 and 102, 110.

The compound brace means as described cooperates with the upper brace members 90 and 92 to provide lateral stability to the tuna tower and permits free upright movement, under the tower, of the occupants of the boat.

The strut means 28 is comprised of a pair of struts 118 and 120 pivotally attached at their upper ends to lugs 122 and 124, fixed to the respective ladder rails 30—30 by yokes 126 and 128 and extending forwardly and downwardly to attachment means 130 and 132 to the respective gunwalls G and G' in the same manner illustrated in FIG. 4 relative to the foot portions of the ladders 12 and 14. The struts provide longitudinal stability to the tuna tower.

From the foregoing description, it is seen that the tuna tower of the present invention is comprised of four sub-assemblies, the two ladder sections, the platform and upper rail assembly in addition to the various braces and spars, all of which can be prefabricated and packaged in a carton for assembly and installation on a variety of types and sizes of boats. The various sub-assemblies, spars and braces are all either slip-fitted or bolted together and the yokes, screw threaded to the base ends of the ladders and spars 118 and 120, are pivotally connected to the base plates 42 to provide a universal adjustment to accommodate any angle of attachment to the deck or gunwalls of a boat by conventional attachment means such as nuts and bolts.

What is claimed is:

1. A tuna tower for installation on a boat comprising,
   A. first and second sub-assemblies, each of which is comprised of,
      1. front and back, upwardly extending, spaced apart side rails, each having upper and lower ends, and
      2. a plurality of horizontal, spaced apart rungs fixed to and spanning the distance between said side rails to form a ladder;
   B. a third sub-assembly comprised of,
      1. front and back top rail members in spanning relation respectively to said front and back upper ends;
      2. a pair of opposed side rails removably connecting between the opposed end portions of said top rail members;
   C. disengageable connection means between the opposed ends of said front and back top rail members and the respective front and back upper ends of said ladders to form a generally inverted U-shaped structure;
   D. a fourth sub-assembly comprised of,
      1. front and back mounting rails,
      2. a platform fixed to and extending between said mounting rails;
   E. disengageable, adjustable mounting means connecting between each of the opposed end portions of said mounting rails and said ladders to maintain said fourth sub-assembly in a horizontal, spanning attitude between said ladders, intermediate said upper and lower ends;
   F. pivotal mounting means for connecting said lower ends to the boat;
   G. generally diagonal brace means connecting between said ladders to provide lateral stability; and
   H. strut means removably connecting between said ladders and the boat to provide longitudinal stability.

2. A tuna tower as defined in claim 1 wherein the opposed end portions of said front and back top rail members are turned generally downwardly.

3. A tuna tower as defined in claim 2 wherein said side rails and top rail members are tubular in form and said disengageable connection means, between each of said top rail ends and its respective ladder upper end, is comprised of an elongated stud, interengaging both tubular end portions and a pin means connecting one of said end portions to said stud.

4. A tuna tower as defined in claim 1 in which said platform is comprised of a plurality of spaced apart, parallel slats.

5. A tuna tower as defined in claim 1 in which said disengageable, adjustable mounting means is comprised of a gusset fixed to and extending inwardly from each of said front and back side rails of both ladders, each gusset providing a plurality of horizontally aligned, spaced apart holes, hole means in each of the opposed end portions of said mounting rails and removable attachment means, such as nuts and bolts, to attach each of said mounting rail end portions to its respective gusset.

6. A tuna tower as defined in claim 5 wherein four holes are provided in each gusset and said hole means comprises two holes which are alignable with any two side-by-side holes of said four.

7. A tuna tower as defined in claim 5 in which said generally diagonal brace means is comprised of a first brace means, above said fourth sub-assembly and a second brace means, below said fourth sub-assembly.

8. A tuna tower as defined in claim 7 wherein said first brace means comprises two elongated rods, removably attached at their upper ends to a downwardly projecting lug, fixed centrally to said back top rail member, and diverging diagonally downwardly to points of removable attachment to the respective back gussets.

9. A tuna tower as defined in claim 7 wherein said second brace means comprises two compound brace assemblies, each consisting of a first elongated, diagonally downwardly extending rod, removably attached at its upper end to a first of said back gussets and at its lower end to the upper end of a second elongated, diagonally downwardly extending rod, said second rod being removably attached at its lower end to said pivotal mounting means, and a tensioning means, such as a turnbuckle, connecting between a second of said back gussets and said lower and upper end connection.

10. A tuna tower as defined in claim 1 including a U-shaped rail fixed to said front top rail and projecting horizontally, forwardly therefrom and a control panel fixed to said U-shaped rail.

* * * * *